(12) United States Patent
Niizuma

(10) Patent No.: US 10,059,214 B2
(45) Date of Patent: Aug. 28, 2018

(54) WIRELESS POWER SUPPLY DEVICE

(71) Applicant: IHI Corporation, Tokyo (JP)

(72) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 27 days.

(21) Appl. No.: 14/709,817

(22) Filed: May 12, 2015

(65) Prior Publication Data

US 2015/0239361 A1 Aug. 27, 2015

Related U.S. Application Data

(63) Continuation of application No. PCT/JP2013/076602, filed on Sep. 30, 2013.

(30) Foreign Application Priority Data

Nov. 13, 2012 (JP) .................................. 2012-249469

(51) Int. Cl.
*H02J 7/00* (2006.01)
*B60L 11/18* (2006.01)
*H02J 50/90* (2016.01)
*H02J 50/12* (2016.01)
*H02J 17/00* (2006.01)
(Continued)

(52) U.S. Cl.
CPC ......... *B60L 11/1829* (2013.01); *B60L 11/182* (2013.01); *B60L 11/1833* (2013.01); *H02J 7/025* (2013.01); *H02J 17/00* (2013.01); *H02J 50/12* (2016.02); *H02J 50/90* (2016.02); *B60M 7/003* (2013.01); *Y02T 10/7005* (2013.01); *Y02T 10/7072* (2013.01); *Y02T 90/12* (2013.01);
(Continued)

(58) Field of Classification Search
CPC ..... H02J 7/025; B60L 11/1829; B60L 11/182; B60L 1/1833
USPC .................................. 320/108, 109; 307/104
See application file for complete search history.

(56) References Cited

U.S. PATENT DOCUMENTS 9,287,720 B2 3/2016 Kawamura
2011/0082612 A1 4/2011 Ichikawa
(Continued)

FOREIGN PATENT DOCUMENTS

JP 09-182212 A 7/1997
JP 10-028332 A 1/1998
(Continued)

OTHER PUBLICATIONS

International Search Report, PCT/JP2013/076602, dated Oct. 29, 2013, 4 pgs total (2 pgs Japanese language; 2 pgs English language).

*Primary Examiner* — Drew A Dunn
*Assistant Examiner* — Zixuan Zhou
(74) *Attorney, Agent, or Firm* — Volpe and Koenig, P.C.

(57) ABSTRACT

A wireless power supply device that is installed in a parking space in which a vehicle can stop and that has a power-supplying coil which wirelessly supplies electric power to a power-receiving coil of the vehicle is provided. The wireless power supply device includes a vehicle wheel detecting unit that is installed in the parking space in which the vehicle can stop and that detects vehicle wheels of the vehicle and traveling assistance means that assists with traveling of the vehicle such that the power-receiving coil and the power-supplying coil have a power-suppliable positional relationship depending on a detection result of the vehicle wheel detecting unit.

20 Claims, 7 Drawing Sheets

(51) Int. Cl.
*H02J 7/02* (2016.01)
*B60M 7/00* (2006.01)

(52) U.S. Cl.
CPC ............ *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2011/0298422 A1* | 12/2011 | Failing | B60L 3/00 320/109 |
| 2012/0091959 A1 | 4/2012 | Martin et al. | |
| 2012/0206099 A1* | 8/2012 | Ichikawa | H02J 7/0036 320/109 |
| 2012/0280649 A1* | 11/2012 | Jung | H02J 5/005 320/108 |
| 2013/0119925 A1 | 5/2013 | Kawamura | |
| 2014/0039728 A1 | 2/2014 | Imazu et al. | |

FOREIGN PATENT DOCUMENTS

| | | |
|---|---|---|
| JP | 2000-092622 A | 3/2000 |
| JP | 2002-152996 A | 5/2002 |
| JP | 2011-106216 A | 6/2011 |
| WO | 2010/052785 A1 | 5/2010 |
| WO | 2011/125632 A1 | 10/2011 |
| WO | 2012-144253 A1 | 10/2012 |

\* cited by examiner (a)

(b)

WIRELESS POWER SUPPLY DEVICE

This application is a continuation application based on a PCT Patent Application No. PCT/JP2013/076602, filed Sep. 30, 2013, whose priority is claimed on Japanese Patent Application No. 2012-249469, filed Nov. 13, 2012. The contents of both the PCT application and the Japanese Patent Application are incorporated herein by reference.

TECHNICAL FIELD

The present invention relates to a wireless power supply device.

BACKGROUND ART

Patent Document 1 discloses an electric vehicle that includes a power-receiving coil which is wirelessly supplied with electric power from a power-supplying coil of a power-supplying facility and that positions the power-receiving coil such that the power-supplying coil and the power-receiving coil have a positional relationship in which they are almost exactly facing each other. Such an electric vehicle includes a camera that captures an image of the outside and a control device that recognizes the position of the power-supplying coil on the basis of the image captured by the camera, causes the electric vehicle to move to the power-supplying coil by controlling a driving motor or the like, estimates the distance between the power-receiving coil and the power-supplying coil on the basis of power-receiving conditions of the power-receiving coil, and controls the driving motor or the like on the basis of the distance information so as to position the power-receiving coil.

DOCUMENT OF RELATED ART

Patent Document

[Patent Document 1]
PCT International Publication No. 2010/052785

SUMMARY OF INVENTION

Technical Problem

In the related art, for example, when the power-receiving coil is positioned with respect to the power-supplying coil buried in a stopping area of a road such as an intersection, the power-supplying coil buried in the stopping area is hidden by a preceding vehicle and thus an image of the power-supplying coil may not be captured by the camera. Particularly, when the distance from the preceding vehicle is small, it is difficult to capture an image of the power-supplying coil. In the related art, when the power-supplying coil is hidden by an obstacle as described above, there is a problem in that it is difficult to recognize the power-supplying coil and to position the power-receiving coil and the power-supplying coil. In the related art, since the vehicle has to be equipped with a camera or a control device that controls the driving motor or the like on the basis of the image captured by the camera, there is a high possibility that the manufacturing cost of the vehicle will increase.

The present invention is conceived in view of the above-described circumstances and an object of the present invention is to enable a power-receiving coil and a power-supplying coil to be positioned without being significantly affected by an obstacle and without increasing the manufacturing cost of a vehicle.

Solution to Problem

According to a first aspect of the present invention, there is provided a wireless power supply device installed in a place for a vehicle to stop and having a power-supplying coil for wirelessly supplying electric power to a power-receiving coil of the vehicle, the wireless power supply device including: a vehicle wheel detecting unit installed in the place for the vehicle to stop and that configured to detect vehicle wheels of the vehicle; and a traveling assistance means configured to assist with traveling of the vehicle such that the power-receiving coil and the power-supplying coil have a power-suppliable positional relationship depending on a detection result of the vehicle wheel detecting unit.

A second aspect of the present invention provides the wireless power supply device according to the first aspect, wherein the traveling assistance means instructs the vehicle to move such that the power-receiving coil and the power-supplying coil have a power-suppliable positional relationship.

A third aspect of the present invention provides the wireless power supply device according to the first or second aspect, wherein the traveling assistance means notifies the vehicle of whether the power-receiving coil and the power-supplying coil have the power-suppliable positional relationship.

A fourth aspect of the present invention provides the wireless power supply device according to any one of the first to third aspects, wherein the vehicle wheel detecting unit includes a plurality of proximity sensors arranged in a traveling direction of the vehicle.

A fifth aspect of the present invention provides the wireless power supply device according to the fourth aspect, wherein the proximity sensors are installed to be located on a side of the vehicle wheels of the vehicle.

A sixth aspect of the present invention provides the wireless power supply device according to the fourth aspect, wherein the proximity sensors are buried in a traveling surface of the place for the vehicle to stop.

A seventh aspect of the present invention provides the wireless power supply device according to the sixth aspect, wherein the proximity sensors are buried in the traveling surface to be arranged in the traveling direction of the vehicle and to be arranged in a direction perpendicular to the traveling direction.

Effects of the Invention

According to the present invention, the traveling assistance means assists with the traveling of the vehicle such that the power-receiving coil and the power-supplying coil have a power-suppliable positional relationship on the basis of the detection result of the vehicle wheel detecting unit installed in a place in which the vehicle can stop. Accordingly, it is possible to enable the power-receiving coil and the power-supplying coil to be positioned without being significantly affected by an obstacle such as another vehicle near the vehicle and without increasing the manufacturing cost of the vehicle.

DESCRIPTION OF EMBODIMENTS

Hereinafter, an embodiment of the present invention will be described with reference to the accompanying drawings.

Figure 1:
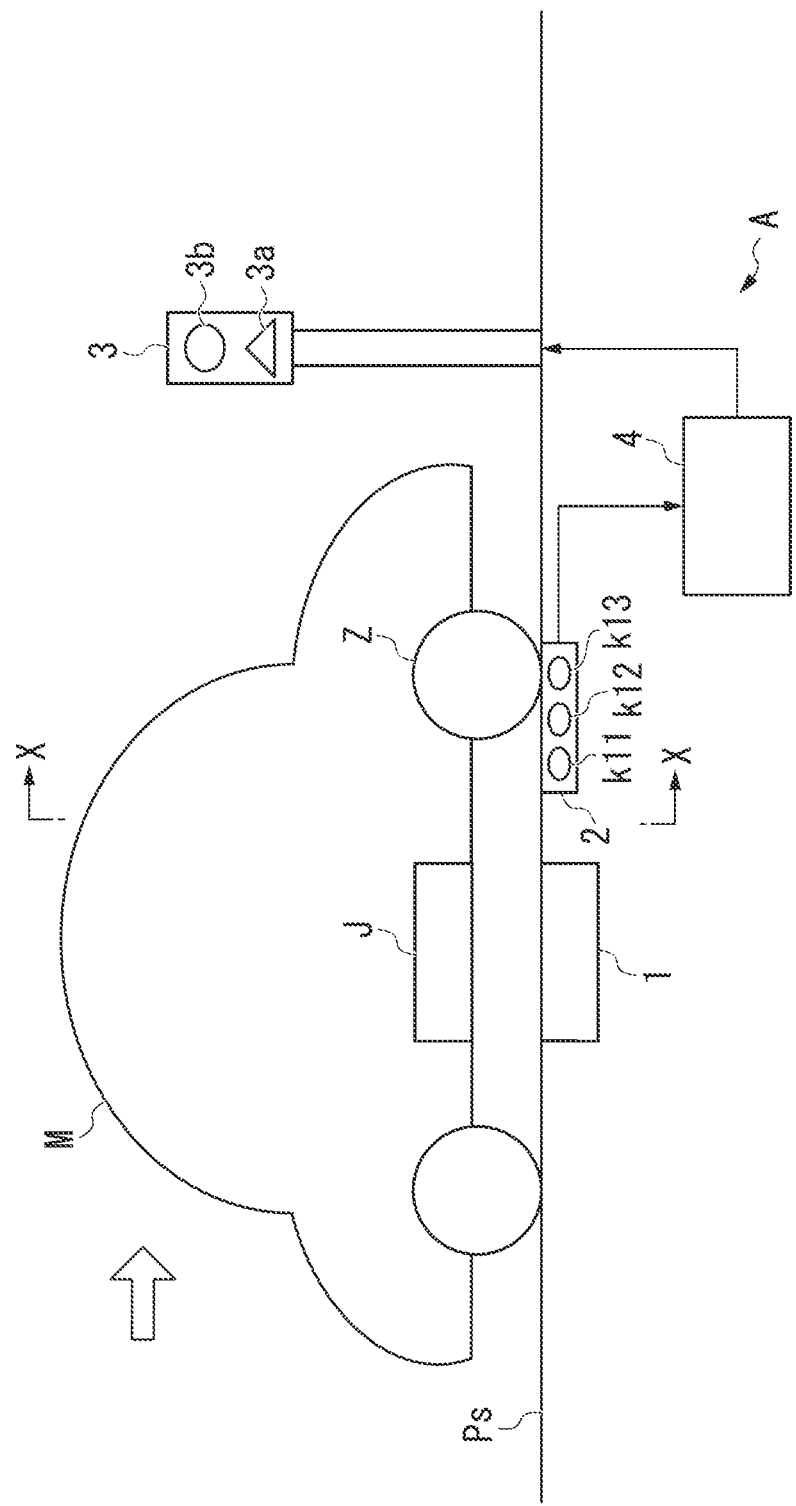
FIG. 1 is a schematic diagram showing a configuration of a wireless power supply device according to an embodiment of the present invention.
Figure 2:
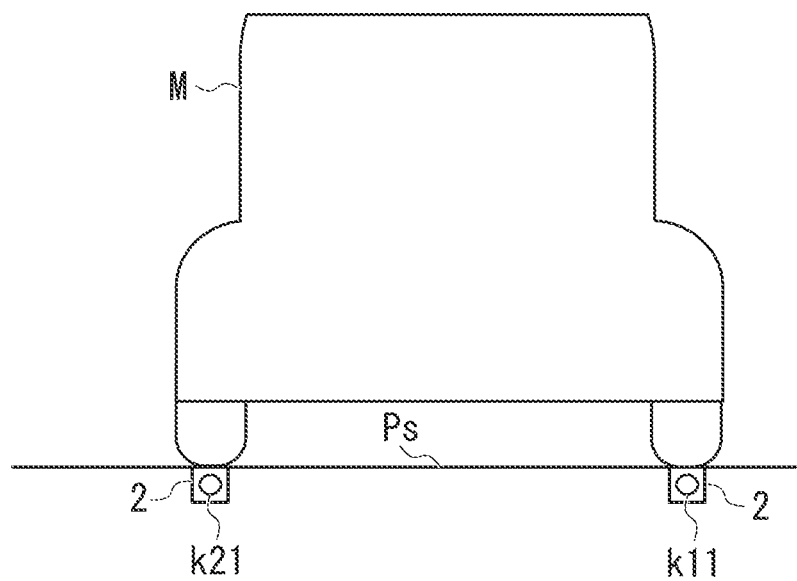
FIG. 2 is a cross-sectional view taken along line X-X of FIG. 1.

A wireless power supply device A according to this embodiment includes a power-supplying coil 1, a vehicle wheel detecting unit 2, a signal light 3, and a control device 4, as shown in FIGS. 1 and 2. The wireless power supply device A wirelessly supplies electric power to a vehicle M parked in a parking space Ps through the power-supplying coil 1. The signal light 3 and the control device 4 constitute the traveling assistance means in this embodiment.

Figure 3:
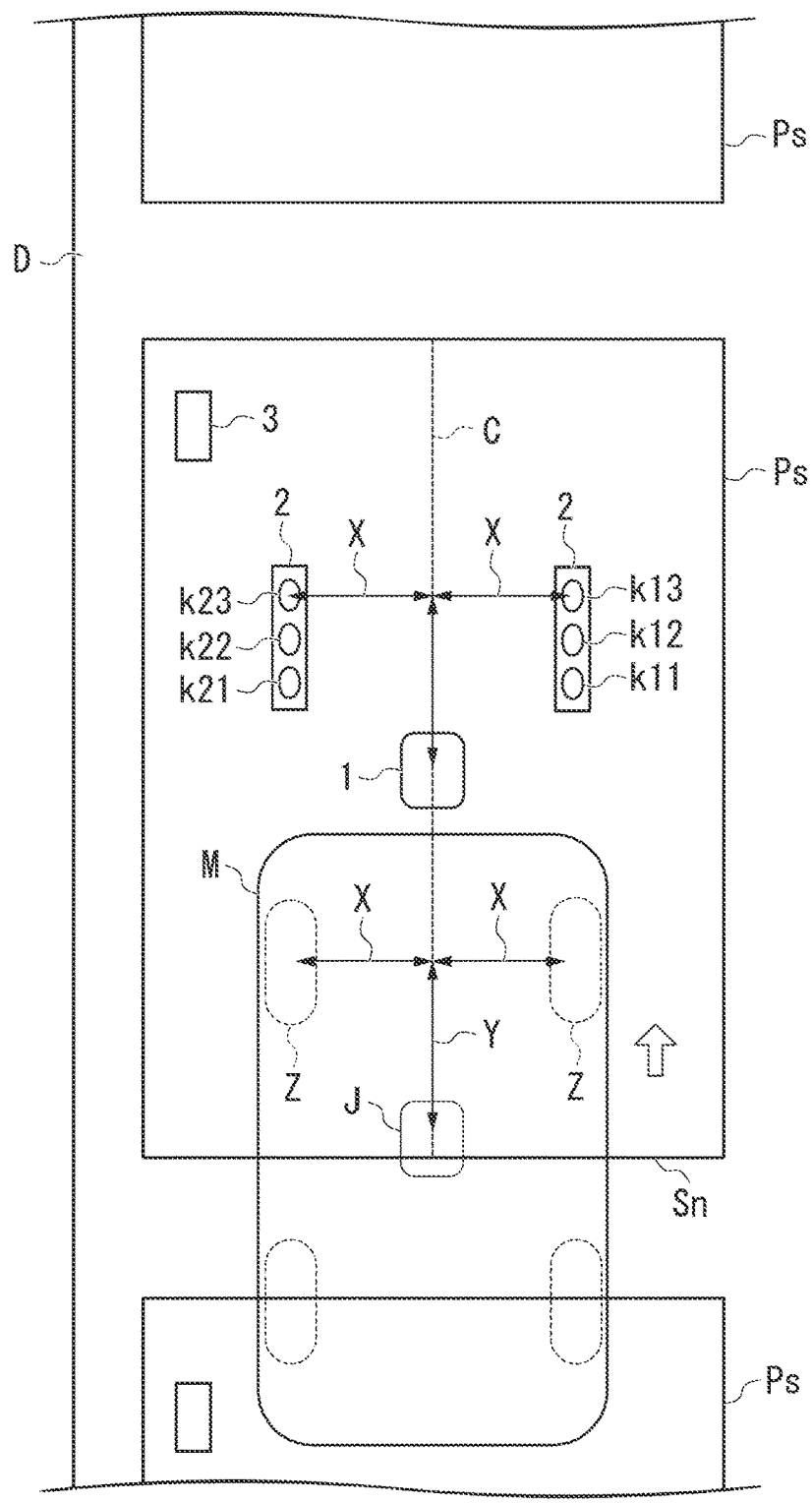
FIG. 3 is a schematic diagram showing an installation example of the wireless power supply device according to the embodiment of the present invention.

The parking space Ps is a rectangular area as shown in FIG. 3 and has an area in which a single vehicle M can be parked. In the parking space Ps, the rear side of a pair of short sides is set as an entrance Sn of the vehicle M as shown in FIG. 3. That is, the vehicle M moves forward and enters the parking space Ps through the entrance Sn. The parking space Ps is an on-street parking space provided at an edge of a road D, for example, as shown in FIG. 3. A plurality of the parking spaces Ps are provided in FIG. 3, but a single parking space may be provided.

The vehicle M charges a storage battery with electric power which a power-receiving coil J has received from the power-supplying coil 1 and uses the electric power with which the storage battery has been charged as a power source for a traveling motor. The vehicle M is an electric automobile or a hybrid automobile that travels by driving vehicle wheels with a motor. The power-receiving coil J is a helical coil having a predetermined coil diameter and is installed on the bottom of the vehicle M such that a coil axis is arranged in the vertical direction. The power-receiving coil J has substantially the same coil diameter as the power-supplying coil 1 which is a ground facility and wirelessly receives AC power through electromagnetic coupling with the power-supplying coil 1. The power-receiving coil J is located at the center in the width direction of the vehicle M and is installed such that the distances X and Y (see FIG. 3) from the front wheels Z in the width direction and the length direction of the vehicle M are predetermined numerical values.

The power-supplying coil 1 is a helical coil having a predetermined coil diameter and is installed at the center of the ground surface (traveling surface) of the parking space Ps. That is, the power-supplying coil 1 is installed such that the center thereof is on the center line C of the parking space Ps. The power-supplying coil 1 radiates a magnetic field (power-supplying magnetic field) by being supplied with AC power of a predetermined frequency from a power-supplying circuit which is not shown. The power-supplying coil 1 is buried in the parking space Ps such that the top surface thereof has the same height as the ground surface in a posture in which a coil axis is arranged in the vertical direction so as to apply the power-supplying magnetic field to the power-receiving coil J and in a state in which the power-supplying coil is exposed in the parking space Ps or in a state in which the power-supplying coil is molded in a nonmagnetic and non-conductive material such as a plastic. The power-supplying coil 1 is installed such that the distances between the power-supplying coil and the proximity sensors k13 and k23 of the vehicle wheel detecting unit 2 to be described later in the width direction and the length direction of the parking space Ps are equal to the above-mentioned distances X and Y (see FIG. 3).

The vehicle wheel detecting unit 2 is a pair of sensors that are installed in the parking space Ps and that are configured to detect the front-right and front-left wheels Z. The vehicle wheel detecting unit 2 includes proximity sensors k11, k12, and k13 that detect the front-right wheel Z and proximity sensors k21, k22, and k23 that detect the front-left wheel Z. The proximity sensors k11 to k13 and k21 to k23 are capacitance sensors or sensors using sound reflection. The proximity sensors k11, k12, and k13 are buried in the ground surface (traveling surface) of the parking space Ps to be arranged at equal intervals in the traveling direction of the vehicle M as shown in the drawings.

The proximity sensors k21, k22, and k23 are separated "by the distance X×2" from the proximity sensors k11, k12, and k13, respectively, to face each other as shown in FIG. 3, and are buried in the ground surface (traveling surface) of the parking space Ps to be arranged at equal intervals in the traveling direction of the vehicle M. The vehicle wheel detecting unit 2 including the proximity sensors k11 to k13 and k21 to k23 outputs a detection signal indicating the detection result to the control device 4. The control device 4 determines the positions of the front wheels Z of the vehicle M based on the detection signal from the vehicle wheel detecting unit 2.

The signal light 3 is installed upright at a front corner of the parking space Ps such that a driver of the vehicle M can confirm the signal light by sight when the vehicle M moves forward and enters the parking space Ps and such that the signal light does not interfere with the forward movement of the vehicle M when the vehicle M moves forward and leaves the parking space Ps. The signal light 3 includes a travel-indicating lamp 3a and a power-suppliable lamp 3b and is configured to assist with the traveling of the vehicle M such that the power-receiving coil J and the power-supplying coil 1 have a power-suppliable positional relationship by turning on or flickering the travel-indicating lamp 3a and the power-suppliable lamp 3b in accordance with a control command from the control device 4.

The travel-indicating lamp 3a instructs the vehicle M to move forward (travel) such that the power-receiving coil J and the power-supplying coil 1 have a power-suppliable positional relationship. The power-suppliable lamp 3b notifies the vehicle M whether the power-receiving coil J and the power-supplying coil 1 have a power-suppliable positional relationship. Specifically, the travel-indicating lamp 3a is turned on or flickered when the vehicle M needs to move forward. The power-suppliable lamp 3b is turned on when the power-receiving coil J and the power-supplying coil 1 have a power-suppliable positional relationship.

The control device 4 is a controller that performs overall control of the wireless power supply device A and is electrically connected to various control targets including the vehicle wheel detecting unit 2 the signal light 3 or a power-supplying circuit (not shown). The control device 4 includes an electronic circuit including a microprocessor and controls the signal light 3 based on a control program stored in a nonvolatile storage device thereof and the detection signal from the vehicle wheel detecting unit 2. Detailed description will be given below.

The operation of the wireless power supply device A having the above-mentioned configuration will be described below.

When the driver intends to park the vehicle M in the parking space Ps, he or she drives the vehicle M straightly forward into the parking space Ps from the entrance Sn of the parking space Ps.

When the vehicle M enters the parking space Ps, the proximity sensors k11, k12, and k13 and the proximity sensors k21, k22, and k23 of the vehicle wheel detecting unit 2 in the wireless power supply device A sequentially detect the front wheels Z of the vehicle M and output the detection signal to the control device 4. The control device 4 controls the signal light 3 as will be described below based on the detection signal input from the vehicle wheel detecting unit 2.

Figure 4A:
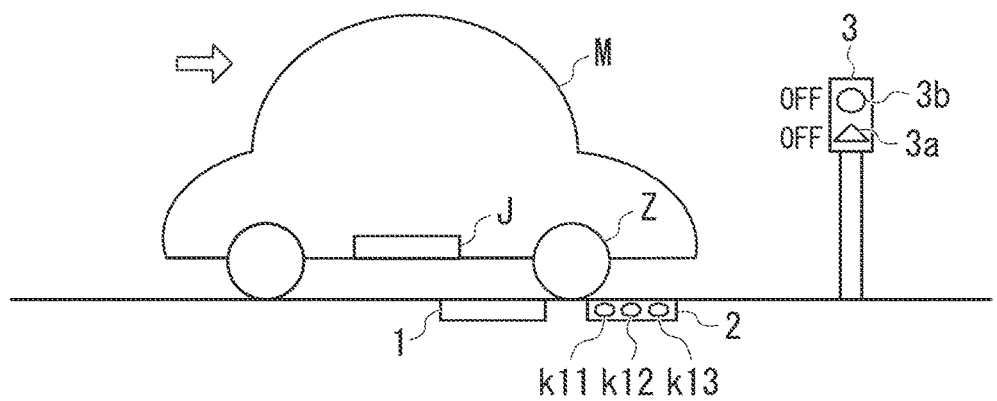
FIG. 4A is a diagram showing an example of the operation of the wireless power supply device according to the embodiment of the present invention.

First, when the front wheels Z do not arrive at a position above the vehicle wheel detecting unit 2, that is, when the front wheels Z are at a position at which they are not detected by the vehicle wheel detecting unit 2, as shown in FIG. 4A, the control device 4 is not supplied with the detection signal indicating that the front wheels Z are detected from the vehicle wheel detecting unit 2 and thus maintains the travel-indicating lamp 3a and the power-suppliable lamp 3b in OFF states.

Figure 4B:
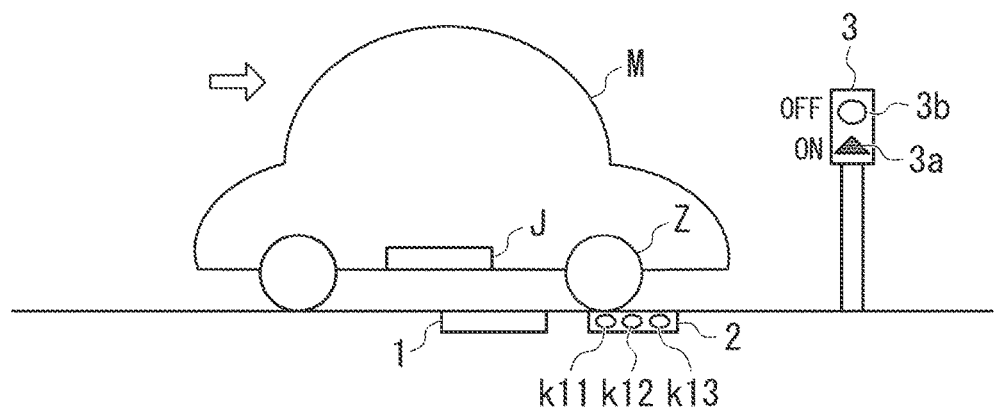
FIG. 4B is a diagram showing an example of the operation of the wireless power supply device according to the embodiment of the present invention.

Subsequently, when the front wheels Z arrive at the position above the nearest proximity sensor k11 (k21), that is, at the position at which the front wheels Z can be detected by the nearest proximity sensor k11 (k21), as shown in FIG. 4B, the control device 4 is supplied with the detection signal indicating that the front wheels Z are detected from the proximity sensor k11 (k21), and thus turns on the travel-indicating lamp 3a and maintains the power-suppliable lamp 3b in the OFF state. By turning on the travel-indicating lamp 3a in this way, the control device encourages the driver to drive the vehicle M forward.

Figure 4C:
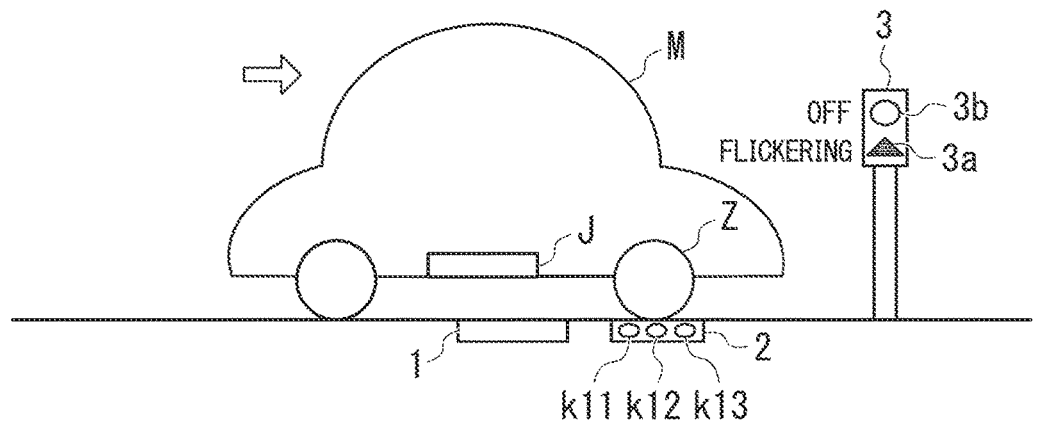
FIG. 4C is a diagram showing an example of the operation of the wireless power supply device according to the embodiment of the present invention.

Subsequently, when the front wheels Z arrive at the position above the middle proximity sensor k12 (k22), that is, at the position at which the front wheels Z can be detected by the middle proximity sensor k12 (k22), as shown in FIG. 4C, the control device 4 flickers the travel-indicating lamp 3a and maintains the power-suppliable lamp 3b in the OFF state. By flickering the travel-indicating lamp 3a in this way, the control device 4 encourages the driver to drive the vehicle M slightly forward.

Figure 4D:
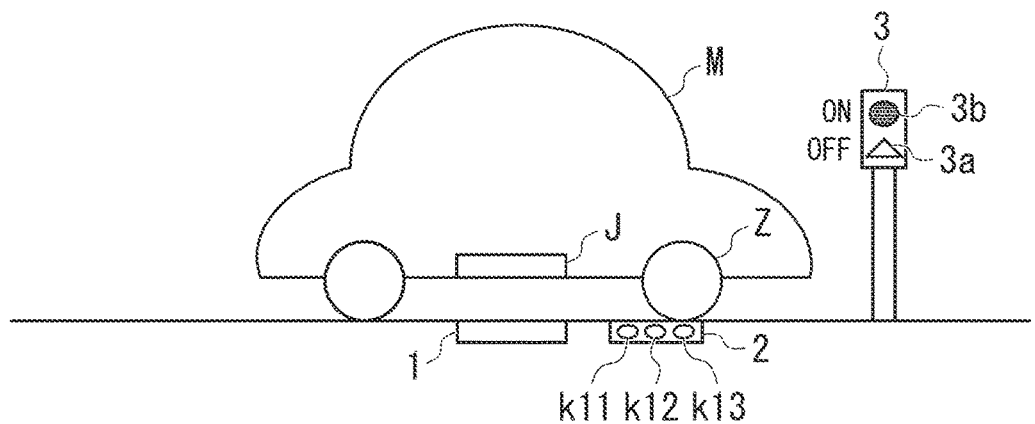
FIG. 4D is a diagram showing an example of the operation of the wireless power supply device according to the embodiment of the present invention.

Subsequently, when the front wheels Z arrive at the position above the innermost proximity sensor k13 (k23), that is, at the position at which the front wheels Z can be detected by the innermost proximity sensor k13 (k23), as shown in FIG. 4D, the control device 4 turns off the travel-indicating lamp 3a and turns on the power-suppliable lamp 3b. By turning on the power-suppliable lamp 3b in this way, the control device notifies the driver of the vehicle M that the power-receiving coil J and the power-supplying coil 1 have a power-suppliable positional relationship.

In this case, since the distance in the length direction from the front wheels Z of the vehicle M to the power-receiving coil J and the distance in the length direction of the parking space Ps from the proximity sensors k13 and k23 in the wireless power supply device A to the power-supplying coil 1 are both Y, the front wheels Z are detected by the proximity sensors k13 (k23). That is, since the front wheels Z are located directly or almost directly above the proximity sensor k13 (k23), it can be determined that the power-receiving coil J is located directly or almost directly above the power-supplying coil 1 and can be supplied with electric power.

The driver causes the vehicle M to stop and inputs a charging instruction to the control device 4 to cause the vehicle M to start a charging operation by operating a charging instruction button which is not shown. The wireless power supply device A causes the power-supplying circuit (not shown) to start a power-supplying operation. Thereafter, when the charging operation is completed and the vehicle M leaves the parking space Ps, the driver moves the vehicle M forward or backward out of the parking space Ps. Regarding the parked vehicle M leaving the parking space Ps, when the front wheels Z are not detected by the vehicle wheel detecting unit 2 in a state in which the wireless supply of electric power is carried out, the control device 4 of the wireless power supply device A determines that the vehicle M has left the parking space Ps, and stops the wireless supply of electric power.

According to this embodiment, the proximity sensors k11 to k13 and k21 to k23 of the vehicle wheel detecting unit 2 buried in the parking space Ps detect the front wheels Z (in contact with the ground surface) of the vehicle M and assist with the traveling of the vehicle M using the signal light 3 such that the power-receiving coil J and the power-supplying coil 1 have a power-suppliable positional relationship depending on the detection result. Accordingly, it is possible to enable the power-receiving coil J and the power-supplying coil 1 to be positioned without being significantly affected by an obstacle such as another vehicle located near the vehicle M and without increasing the manufacturing cost of the vehicle M. The proximity sensors of the vehicle wheel detecting unit 2 buried in the ground do not interfere with the entrance and exit of the vehicle M into or from the parking space Ps or the movement of another vehicle or a pedestrian entering the parking space Ps when the vehicle M is not parked therein.

While the embodiment of the present invention has been described above, the present invention is not limited to the embodiment and, for example, the following modifications can be considered.

Figure 5:
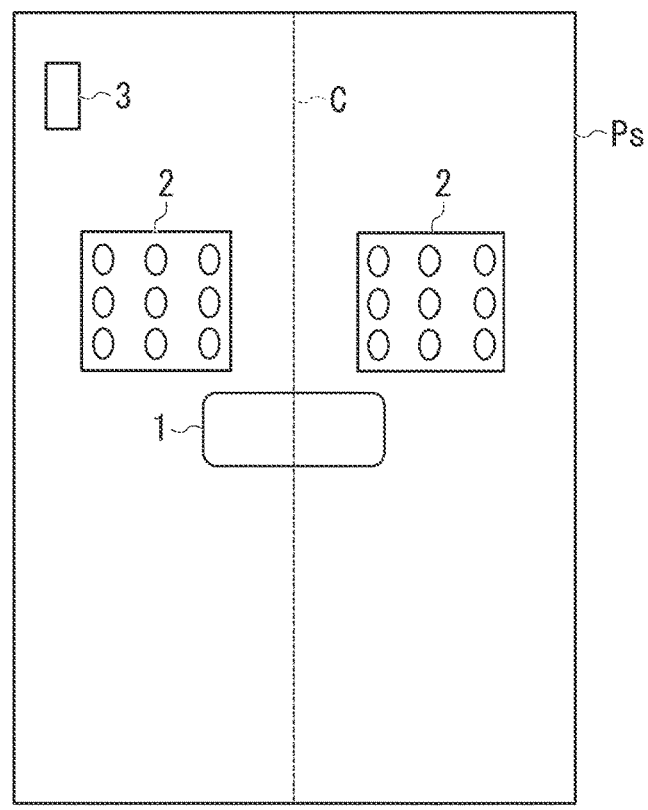
FIG. 5 is a diagram showing a variant example of the wireless power supply device according to the embodiment of the present invention.
Figure 5:
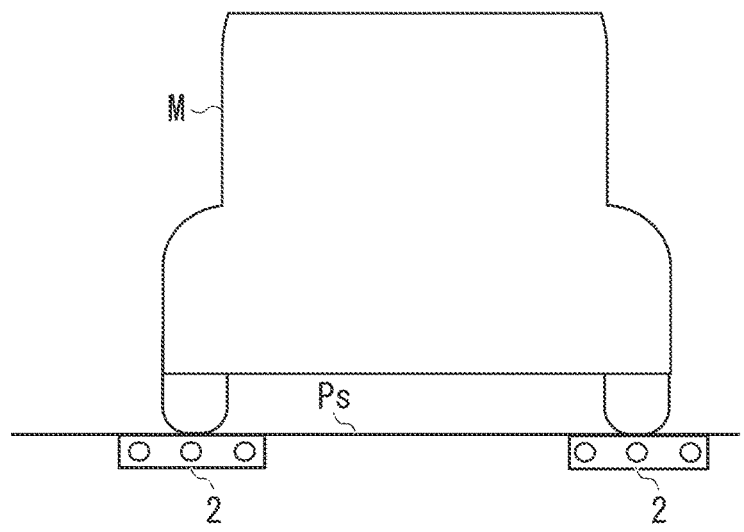

(1) In the above-mentioned embodiment, the front wheels Z are detected by the proximity sensors k11 to k13 and k21 to k23 arranged in the traveling direction of the vehicle M, but the present invention is not limited to this configuration. For example, as shown in FIG. 5, the proximity sensors may be buried in the parking space Ps to be arranged in the traveling direction of the vehicle M and to be arranged in the direction perpendicular to the traveling direction. As a result, even when the position of the vehicle M deviates to the right or left side, it is possible to detect the front wheels Z of the vehicle M.

In this case, as shown in FIG. 5, it is possible to cause the power-receiving coil J and the power-supplying coil 1 to face each other by increasing the width of the power-supplying coil 1. A pair of vehicle wheel detecting units 2 are installed to detect the front-right and front-left wheels Z, but only one may be installed to only detect one front wheel Z.

Figure 6A:
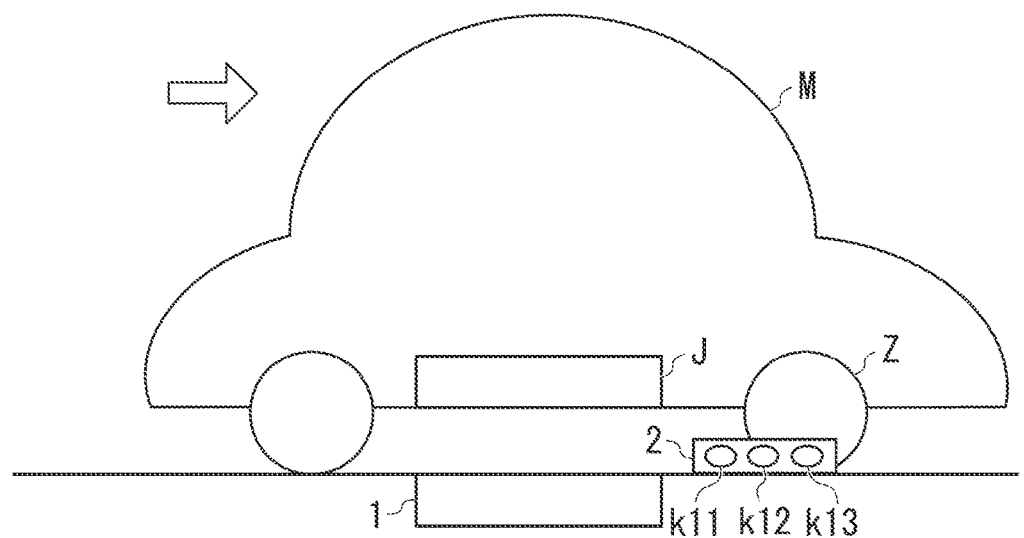
FIG. 6A is a diagram showing a variant example of the wireless power supply device according to the embodiment of the present invention.
Figure 6B:
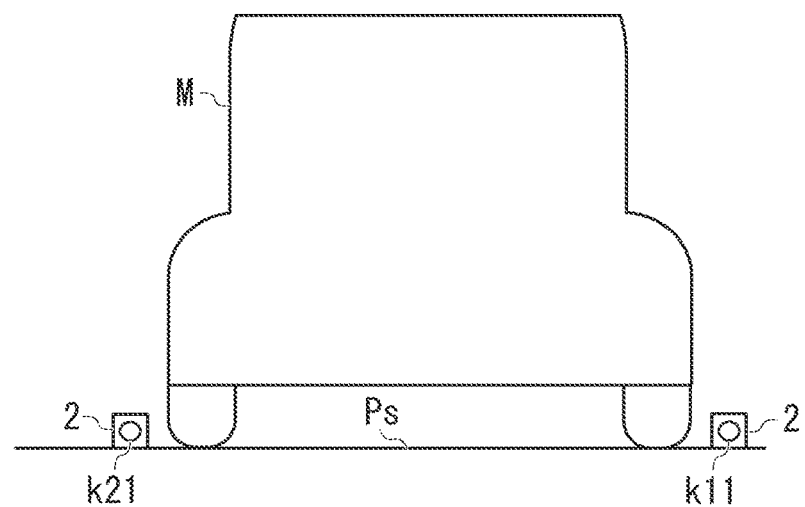
FIG. 6B is a diagram showing a variant example of the wireless power supply device according to the embodiment of the present invention.

(2) In the above-mentioned embodiment, the vehicle wheel detecting unit 2 is buried in the parking space Ps, but the vehicle wheel detecting unit 2 may be installed on a side of the vehicle wheels Z of the vehicle M as shown in FIGS. 6A and 6B. It is preferable that the height of the vehicle wheel detecting unit 2 be set such that the vehicle M runs over the vehicle wheel detecting unit and the vehicle wheel detecting unit interferes with the traveling of the vehicle M as little as possible.

(3) In the above-mentioned embodiment, an example in which the wireless power supply device A is installed in the parking space Ps which is used as an on-street parking has been described, but the wireless power supply device A may be installed in a place in which a vehicle temporarily stops while passing such as a stopping area of a road such as an intersection or a stopping area before the vehicle enters a parking lot in addition to the on-street parking space.

The wireless power supply device A may also be installed in a dead-end type parking space Ps. The wireless power supply device A may be installed in a general structure for supporting a vehicle such as a parking space on a second or higher floor of a multi-floor parking lot or a top surface of a pallet of an automated parking lot in addition to the parking space Ps installed on the ground surface.

(4) In the above-mentioned embodiment, it is assumed that the vehicle M enters the parking space Ps by moving forward, but the present invention is not limited to this configuration. That is, when the power-receiving coil J of the vehicle M is installed such that the distances to the rear wheels in the width direction and the length direction of the vehicle M are predetermined numerical values (distances X and Y), it may be assumed that the vehicle M enters the parking space Ps by moving backward.

(5) In the above-mentioned embodiment, the power-supplying coil 1 may be exposed from the ground surface or may be installed above the ground surface as long as the power-supplying coil has a height which the vehicle M can move over without any problem.

(6) In the above-mentioned embodiment, the driver of the vehicle M is visually notified using the signal light 3, but the driver may also be acoustically notified using a loudspeaker. A notification device that is placed inside the vehicle or is worn by a driver (attached to the body of the driver) may be supplied with a command using radio waves or light waves (wires may also be used) and the driver may be notified visually, acoustically, or tactually (vibration of a vibrator, a magnitude of vibration, or a vibration frequency). For example, a smart phone may be fixed to a cradle inside the vehicle, the same command as the control command to the signal light 3 may be wirelessly given to the smart phone from the control device 4, and the same display as in the travel-indicating lamp 3a and the power-suppliable lamp 3b may be performed on the screen of the smart phone. The smart phone may be attached to the body of the driver and the driver may be notified of the traveling indication or the supply of electric power using vibration of a vibrator built into the smart phone.

(7) In the above-mentioned embodiment, the proximity sensors k11 to k13 and k21 to k23 are used as the vehicle wheel detecting unit 2, but the present invention is not limited to this configuration. For example, the tires of the front wheels Z may be detected (by obliquely projecting a light spot to the tires and measuring the reflection position of the light spot using an array sensor) using an optical sensor or the like instead of the proximity sensors k11 to k13 and k21 to k23.

(8) In the above-mentioned embodiment, it is preferable that the proximity sensors k11 to k13 and k21 to k23 have a certain degree of directivity so as not to detect the ground surface, or a detection threshold value thereof may be adjusted. In the examples shown in FIGS. 1 to 5, it is preferable that the proximity sensors have upward directivity and the threshold value be adjusted to detect an object slightly above the ground surface. In the example shown in FIGS. 6A and 6B, it is preferable that the proximity sensors have directivity slightly upward from the horizontal direction or directivity in the direction of the center line C so as not to detect the ground surface and that the detection threshold value be adjusted so as not to allow the right and left proximity sensors to interfere with each other.

The control device 4 may give a command to the signal light 3 only when the detection results of the proximity sensors k11 to k13 and k21 to k23 have the same value for a predetermined time period or longer so as to avoid providing notification from the signal light 3 to a passing vehicle M. When a plurality of proximity sensors that simultaneously operate and interfere with each other are arranged, the proximity sensors may be made to sequentially operate using a signal from the control device 4.

(9) In the above-mentioned embodiment, the magnetic resonance system is employed as the method of wirelessly supplying electric power, but an electromagnetic induction system may be employed.

(10) The power-supplying coil 1 and the power-receiving coil J are not limited to the helical coil. A coil of an arbitrary type or shape such as a solenoid shape can be employed as long as electric power can be wirelessly supplied between the power-supplying coil 1 and the power-receiving coil J, and the types, shapes, and sizes of the coils may be different from each other.

(11) The vehicle wheels which are detected by the vehicle wheel detecting unit 2 according to the above-mentioned embodiment are not limited to rubber tires, and may include general wheels for traveling of a vehicle, which rotate in contact with the traveling surface (road surface, ground surface) on which the vehicle M travels.

INDUSTRIAL APPLICABILITY

The wireless power supply device according to the present invention enables a power-receiving coil and a power-supplying coil to be positioned without being significantly affected by an obstacle and without increasing the manufacturing cost of a vehicle.

The invention claimed is:

1. A wireless power supply device installed in a place for a vehicle to stop and having a power-supplying coil for wirelessly supplying electric power to a power-receiving coil of the vehicle, the wireless power supply device comprising:
   a vehicle wheel detecting unit installed in the place for the vehicle to stop so that the vehicle is able to run over the vehicle wheel detecting unit and configured to detect vehicle wheels of the vehicle; and
   a traveling assistance means configured to assist with traveling of the vehicle such that the power-receiving coil and the power-supplying coil have a power-suppliable positional relationship depending on a detection result of the vehicle wheel detecting unit,
wherein when one or more of the vehicle wheels is detected by the vehicle wheel detecting unit, the detection result is a detection signal provided by the vehicle wheel detecting unit, and
the traveling assistance means assists with traveling of the vehicle only when the power-receiving coil and the power-supplying coil do not have a power-suppliable positional relationship, and the detection signal, received by the traveling assistance means, is maintained for a predetermined time period or longer.

2. The wireless power supply device according to claim 1, wherein the traveling assistance means instructs the vehicle to move such that the power-receiving coil and the power-supplying coil have the power-suppliable positional relationship.

3. The wireless power supply device according to claim 1, wherein the traveling assistance means notifies the vehicle of whether the power-receiving coil and the power-supplying coil have the power-suppliable positional relationship.

4. The wireless power supply device according to claim 2, wherein the traveling assistance means notifies the vehicle of whether the power-receiving coil and the power-supplying coil have the power-suppliable positional relationship.

5. The wireless power supply device according to claim 1, wherein the vehicle wheel detecting unit includes a plurality of proximity sensors arranged in a traveling direction of the vehicle.

6. The wireless power supply device according to claim 2, wherein the vehicle wheel detecting unit includes a plurality of proximity sensors arranged in a traveling direction of the vehicle.

7. The wireless power supply device according to claim 3, wherein the vehicle wheel detecting unit includes a plurality of proximity sensors arranged in a traveling direction of the vehicle.

8. The wireless power supply device according to claim 4, wherein the vehicle wheel detecting unit includes a plurality of proximity sensors arranged in a traveling direction of the vehicle.

9. The wireless power supply device according to claim 5, wherein the proximity sensors are installed to be located on a side of the vehicle wheels of the vehicle.

10. The wireless power supply device according to claim 6, wherein the proximity sensors are installed to be located on a side of the vehicle wheels of the vehicle.

11. The wireless power supply device according to claim 7, wherein the proximity sensors are installed to be located on a side of the vehicle wheels of the vehicle.

12. The wireless power supply device according to claim 8, wherein the proximity sensors are installed to be located on a side of the vehicle wheels of the vehicle.

13. The wireless power supply device according to claim 5, wherein the proximity sensors are buried in a traveling surface of the place for the vehicle to stop.

14. The wireless power supply device according to claim 6, wherein the proximity sensors are buried in a traveling surface of the place for the vehicle to stop.

15. The wireless power supply device according to claim 7, wherein the proximity sensors are buried in a traveling surface of the place for the vehicle to stop.

16. The wireless power supply device according to claim 8, wherein the proximity sensors are buried in a traveling surface of the place for the vehicle to stop.

17. The wireless power supply device according to claim 13, wherein the proximity sensors are buried in the traveling surface to be arranged in the traveling direction of the vehicle and to be arranged in a direction perpendicular to the traveling direction.

18. The wireless power supply device according to claim 14, wherein the proximity sensors are buried in the traveling surface to be arranged in the traveling direction of the vehicle and to be arranged in a direction perpendicular to the traveling direction.

19. The wireless power supply device according to claim 15, wherein the proximity sensors are buried in the traveling surface to be arranged in the traveling direction of the vehicle and to be arranged in a direction perpendicular to the traveling direction.

20. The wireless power supply device according to claim 16, wherein the proximity sensors are buried in the traveling surface to be arranged in the traveling direction of the vehicle and to be arranged in a direction perpendicular to the traveling direction.

* * * * *